US007118043B2

(12) United States Patent
Huang

(10) Patent No.: US 7,118,043 B2
(45) Date of Patent: Oct. 10, 2006

(54) HANGING TAB WITH SENSING CHIP

(76) Inventor: Kuo Chin Huang, No. 22, Lane 216, Pu-I Road, Chung-Li City, Tao-Yuan Hsien (TW)

( * ) Notice: Subject to any disclaimer, the term of this patent is extended or adjusted under 35 U.S.C. 154(b) by 170 days.

(21) Appl. No.: 10/885,089

(22) Filed: Jul. 7, 2004

(65) Prior Publication Data

US 2006/0006304 A1 Jan. 12, 2006

(51) Int. Cl.
*G06K 19/00* (2006.01)

(52) U.S. Cl. ...................... 235/487; 235/385; 235/486; 235/492; 428/138

(58) Field of Classification Search ................ 235/486; 248/322; 40/299.01; 340/572.8
See application file for complete search history.

(56) References Cited

U.S. PATENT DOCUMENTS

| | | | | |
|---|---|---|---|---|
| 5,583,489 | A * | 12/1996 | Loemker et al. | 340/572.8 |
| 6,199,309 | B1 * | 3/2001 | Markarian | 40/299.01 |
| 6,395,373 | B1 * | 5/2002 | Conti et al. | 428/138 |
| 6,433,686 | B1 * | 8/2002 | Feibelman | 340/572.8 |
| 6,634,563 | B1 * | 10/2003 | Lippert | 235/492 |
| 6,724,311 | B1 * | 4/2004 | Kolton et al. | 340/572.8 |

* cited by examiner

*Primary Examiner*—Seung H Lee
(74) *Attorney, Agent, or Firm*—Troxell Law Office PLLC

(57) ABSTRACT

A hanging tab with a sensing chip, when in manufacturing, a fine net section for sewing or knitting and a frame are integrally shaped by injection molding; the frame has a fine net section, and includes an integrally formed fine-net frame surrounding a fine net, and has a sensing-chip frame section with a recess to receive a sensing chip; a sensing-chip cover can be integrally formed with the frame or separately formed, it can cover the recess to seal the sensing chip in the sensing-chip frame section. Thereby, an effect of simplifying the manufacturing process and increasing the speed as well as lowering the cost of production can be acquired.

12 Claims, 8 Drawing Sheets

HANGING TAB WITH SENSING CHIP

BACKGROUND OF THE INVENTION

1. Field of the Invention

The present invention is related to an improved structure of a hanging tab, and especially to a structure of hanging tab with a sensing chip.

2. Description of the Prior Art

By advancing of as well as lowering of cost the technique of electronic chip, a hanging tab can be placed therein with a sensing chip, the chip is recorded with specific data of a commodity for the convenience of clearing account and theft proofing etc.

FIGS. 1 and 2 disclose a hanging tab available presently. In manufacturing, plastic material such as ABS, polyethylene or polypropylene etc. is shaped by injection molding to form a frame 10 which at least is divided into five sections: a first fine-net clamping frame 11, a sensing-chip receiving frame 12, a sensing-chip cover 13, a second fine-net clamping frame 14 and a hook 15. Wherein the first and the second fine-net clamping frames 11, 14 are respectively provided with holes 111 and 141, thereby a piece of fine net 16 clamped in each frame 11, 14 is fixed and partially exposed; the sensing-chip receiving frame 12 is a recessed structure, and can accommodates therein a sensing chip 17 which is covered with the sensing-chip cover 13. There are a lot of welding spots 18 in the frame 10.

When in manufacturing, the frame 10 is shaped by injection molding in advance, then a suitable length and width of fine net 16 is taken out of a fine-net roll 19 and is laid over the hole 141 of the second fine-net clamping frame 14, then the sensing chip 17 is placed on the sensing-chip cover 13.

Referring then to FIG. 2 again, the first fine-net clamping frame 11 and the sensing-chip receiving frame 12 are folded to respectively lap over the second fine-net clamping frame 14 and the sensing-chip cover 13, such as are shown with the dotted lines in FIG. 2, they are folded in conforming to the direction of the arrow G1, thereby the sensing chip 17 is sealed by the sensing-chip receiving frame 12 and the sensing-chip cover 13, while the fine nets 16 are clamped between the holes 111, 141 of the sensing-chip receiving frame 12 and the sensing-chip cover 13. And the welding spots 18 in the frame 10 can be melted for connecting integrally by an ultra-sound process.

Among such hanging tab structures available presently, the fine nets 16 are sewn or knitted on commodities, in order that the hanging tabs can be attached to these commodities to provide specific data of sensing chips 17 for detecting by an account-clearing machine, and to provide a security function.

In such a hanging tab available presently, by the fact that the fine nets 16 and the frame 10 are separately designed, the procedure of the process of manufacturing becomes complicated, two rails are necessarily provided to separately assemble the fine nets 16 and the sensing chips 17. This will increase the cost of production. Especially, when the separate fine nets 16 are necessarily clamped with a first fine-net clamping frame 11 and a second fine-net clamping frame 14, plastic material for injection molding is increased, this is unfavorable to mass production economically. Sometimes the fine nets 16 may be unsteadily clamped, and are subjected to dropping to make separation of the hanging tab from the commodity. These are the main defects resided in the prevailing hanging tabs.

SUMMARY OF THE INVENTION

The primary object of the present invention is to provide a hanging tab with a sensing chip, when in manufacturing, a fine net section and a frame are integrally shaped by injection molding; the frame forms a fine-net frame around the fine net section, and includes a sensing-chip frame section having a recess to receive the sensing chip. And a sensing-chip cover can be integrally formed with the frame or separately formed, it can cover the recess to seal the sensing chip in the sensing-chip frame section, thus the whole hanging tab is formed.

Another object of the present invention is to provide a hanging tab with a sensing chip, wherein the fine net section is integrally formed with the frame to reduce material required for injection molding and to lower the cost of production.

Another object of the present invention is to provide a hanging tab with a sensing chip, wherein the fine net section is integrally formed with the frame to save rails for a fine-net roll, thus an effect of simplifying the manufacturing process and increasing the speed of production can be acquired.

Moreover, in the present invention, the fine net section is integrally formed with the frame; there will be no problem of dropping of the fine net from the frame.

The hanging tab of the present invention is provided around the recess of the sensing-chip frame section with a plurality of engaging members, while the sensing-chip cover is provided with a plurality of engaging holes. By engaging of the engaging members in the engaging holes, the sensing-chip cover can be directly engaged with the sensing-chip frame section to seal the sensing chip. Thereby, there is no necessity of melting for connecting by an ultra-sound process.

Further, in designing, the present invention is provided with a stab means on a lateral side of the hanging tab by integrally or separately forming, the stab means is a rod having thereon a lot of small stabs extending outwardly, these stabs have inverted hooks to directly pierce fabric material of a commodity to fix the hanging tab.

And more, the frames of the present invention are all made of plastic by integrally injection molding, and the fine net can be substituted by a thin film, the thin film has a thickness smaller than that of a thin-film frame thereof for sewing or knitting.

The present invention will be apparent in its structural feature and the process of manufacturing after reading the detailed description of the preferred embodiment thereof in reference to the accompanying drawings.

DETAILED DESCRIPTION OF THE PREFERRED EMBODIMENT

Figure 1:
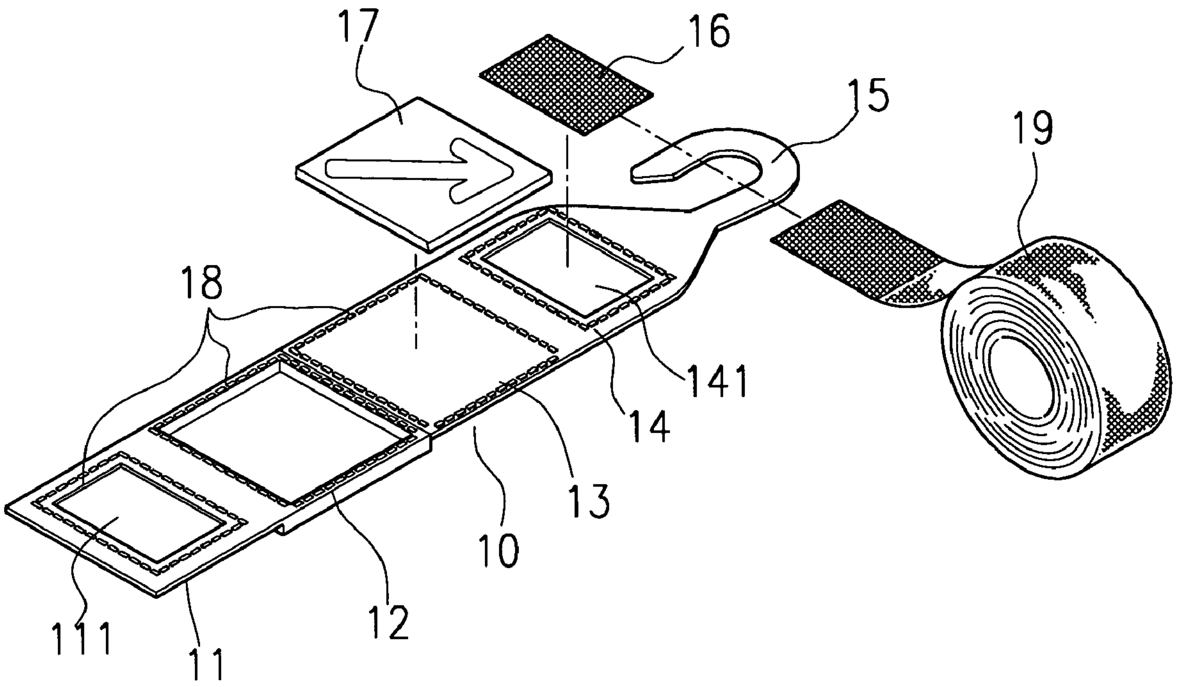
FIG.1 (PRIOR ART)
FIG. 1 is an analytic perspective view showing detaching and assembling of a conventional hanging tab with a sensing chip.
Figure 2:
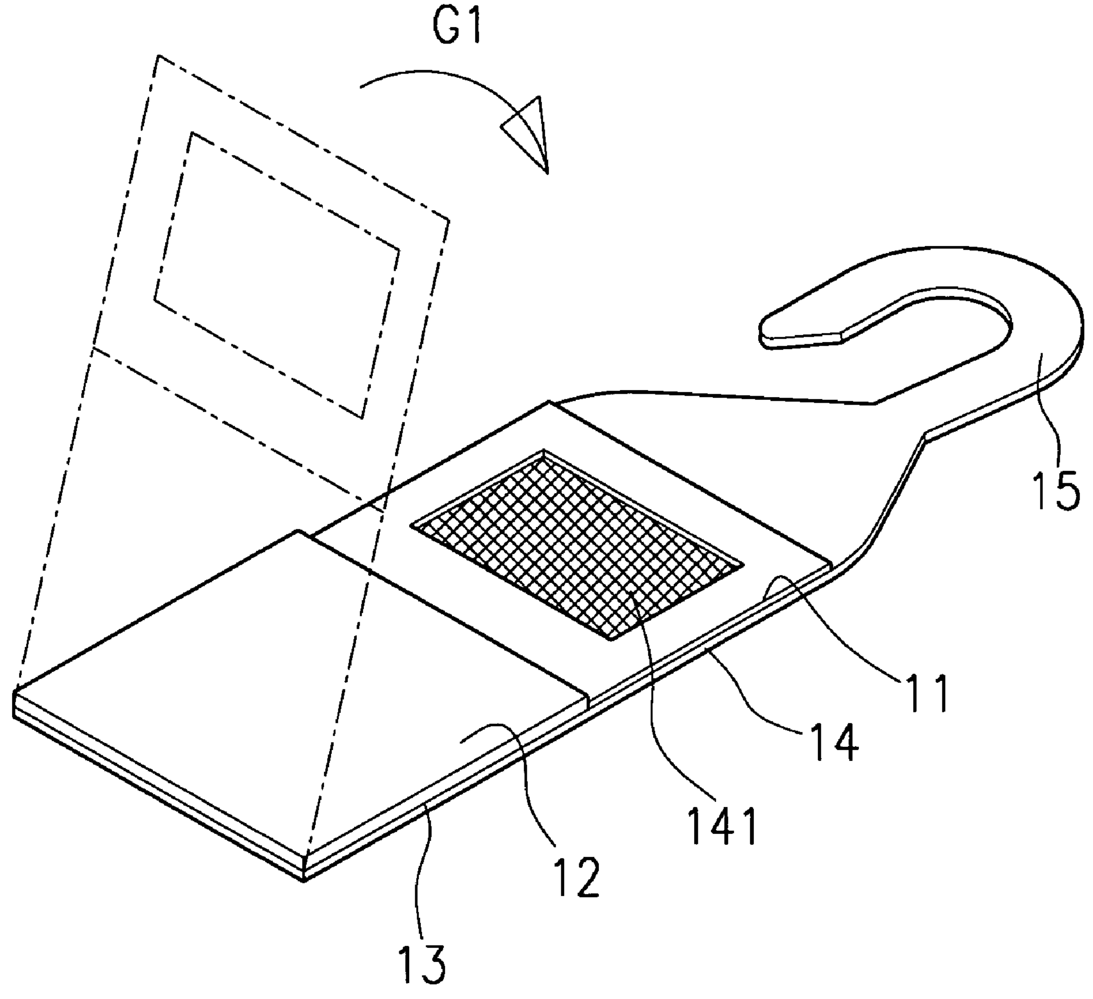
FIG.2 (PRIOR ART)
FIG. 2 is a perspective schematic view showing the action of assembling of the conventional hanging tab with a sensing chip in FIG. 1.
Figure 3:
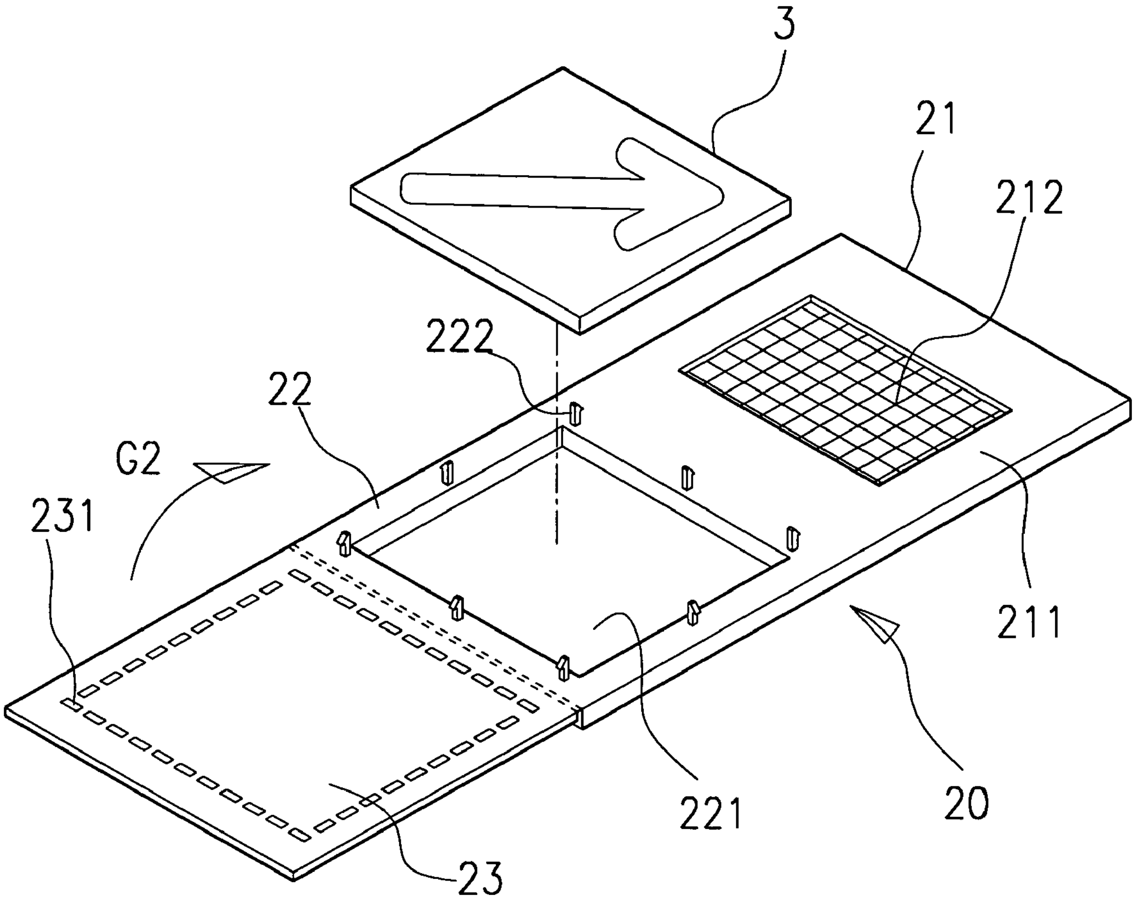
FIG. 3 is an analytic perspective view showing a preferred embodiment of the present invention.
Figure 4:
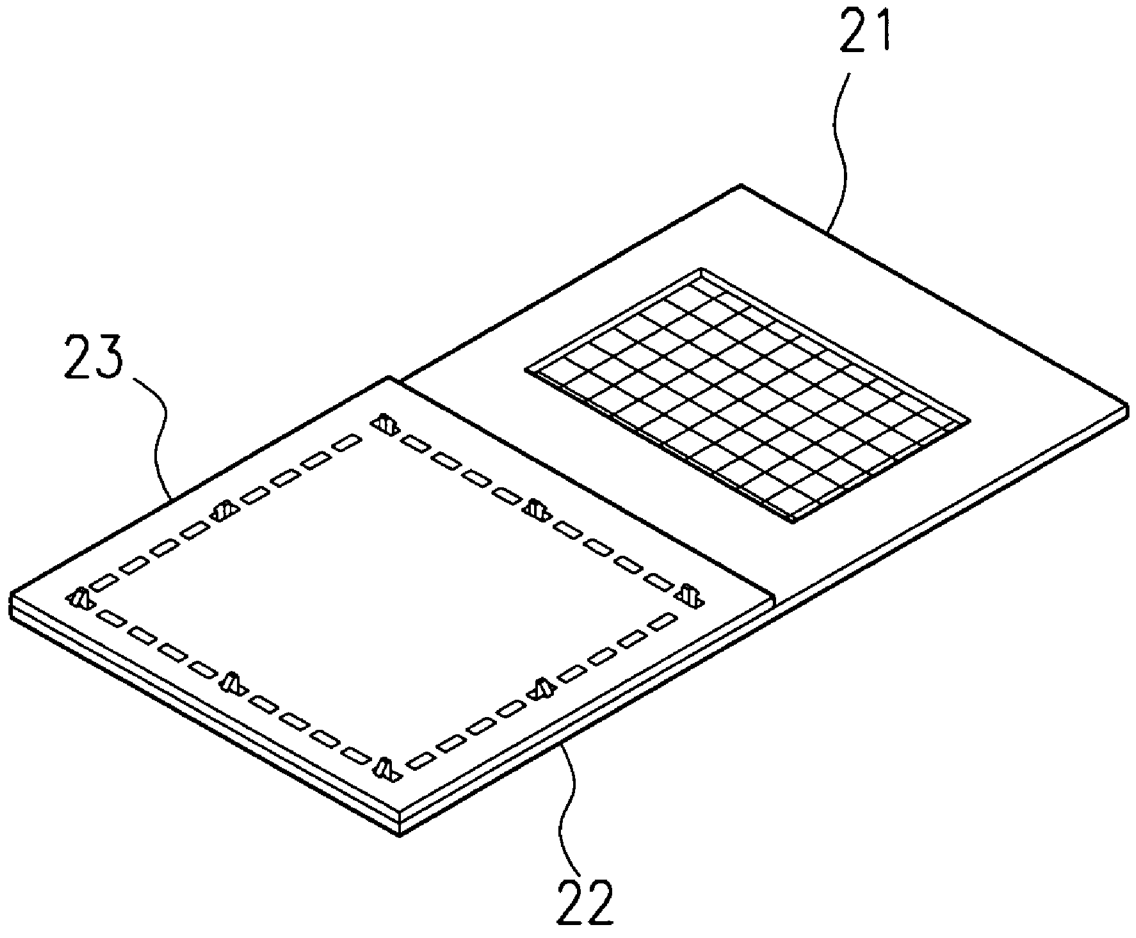
FIG. 4 is a perspective view showing the preferred embodiment of the present invention is assembled.
Figure 5:
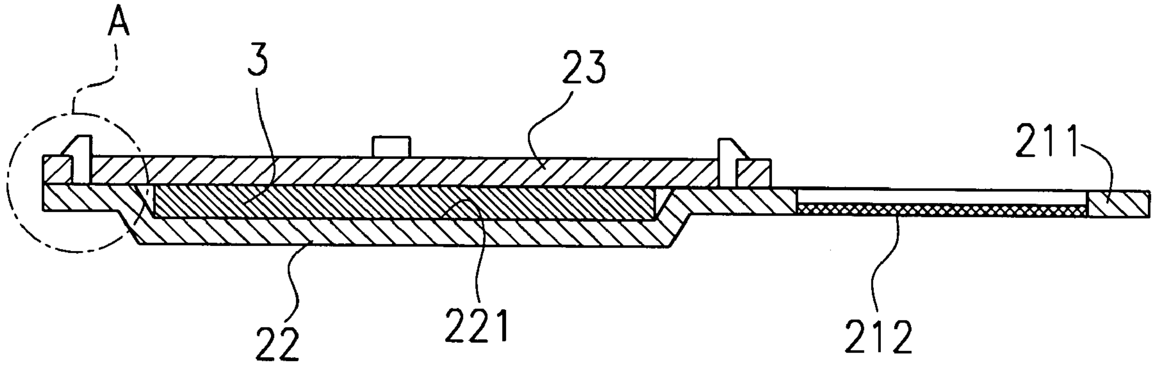
FIG. 5 is a sectional view taken from FIG. 4.

Referring to FIGS. 3, 4 and 5, when in manufacturing a hanging tab of the present invention, a frame 20 is integrally shaped by injection molding, the frame 20 forms a fine-net section 21 around a fine net 212, and includes a sensing-chip frame section 22 and a sensing chip 3.

The fine-net section 21 has a fine net 212 at its center surrounded by a fine-net frame 211, so that the fine net 212 will not drop from the fine-net frame 211. And the technique of shaping by injection molding available now can achieve such mode of manufacturing.

Figure 5A:
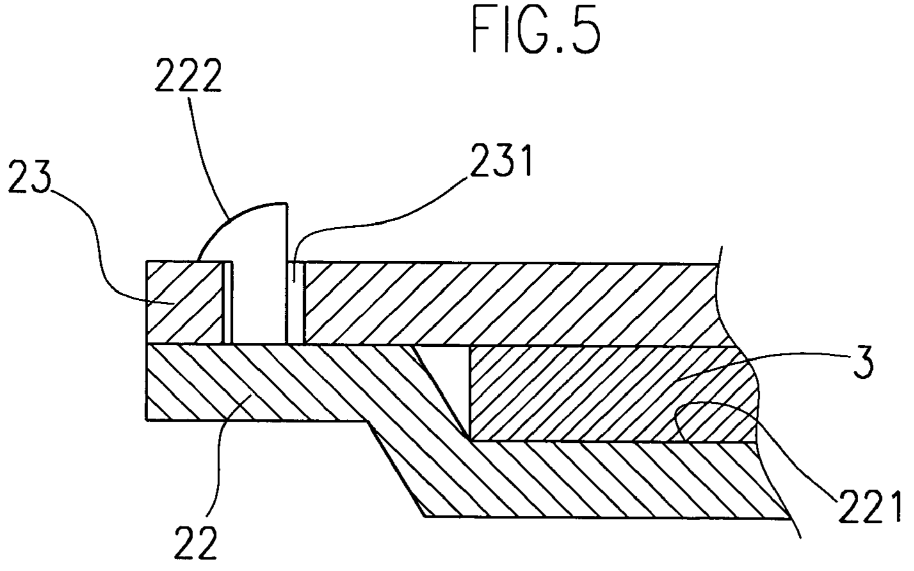
FIG. 5A is an enlarged view of an "A" part taken from FIG. 5.

The sensing-chip frame section 22 has a recess 221 to receive a sensing chip 3; the recess 221 has therearound a plurality of engaging members 222. In FIG. 5A, the engaging members 222 each can be in the form of a semi-arrow (but not limited to this form) to provide a function of an inverted hook.

The area of a sensing-chip cover 23 is larger than that of an opening of the recess 221 receiving the sensing chip 3, this will provide a function of sealing the entire sensing chip 3. The sensing-chip cover 23 is provided with a plurality of engaging holes 231 each of the size to allow extending through and engaging of an engaging member 222, such as is shown in FIG. 5.

Thereby, in manufacturing of the present invention, the frame 20 is integrally shaped by means of an injection molding machine, then the sensing chip 3 is placed in the recess 221 of the sensing-chip frame section 22; and then the sensing-chip cover 23 is turned over for covering as shown by the arrow G2 in FIG. 3, thereby the engaging members 222 are engaged in the engaging holes 231, and thus the whole process of manufacturing is completed.

By the fact that in the specific designed structure and process of the present invention, the fine net 212 is integrally shaped with the frame 20, it is no more necessary to have any rail to place in the fine net 212. And by the fact that the fine net 212 is also made of plastic material, the cost of production by integrally injection molding as well as the amount of plastic used thus can be reduced. And the fine net 212 will have no problem of loosening and dropping after integrally injection molding.

By virtue that the sensing-chip cover 23 and the sensing-chip frame section 22 of the present invention are mutually engaged by engaging of the engaging members 222 with the engaging holes 231, there is no necessity of melting for connecting by an ultra-sound process in assembling, so that the process of manufacturing can be more simplified. Thereby the present invention can be surely cost lower than those hanging tabs available presently.

Figure 6:
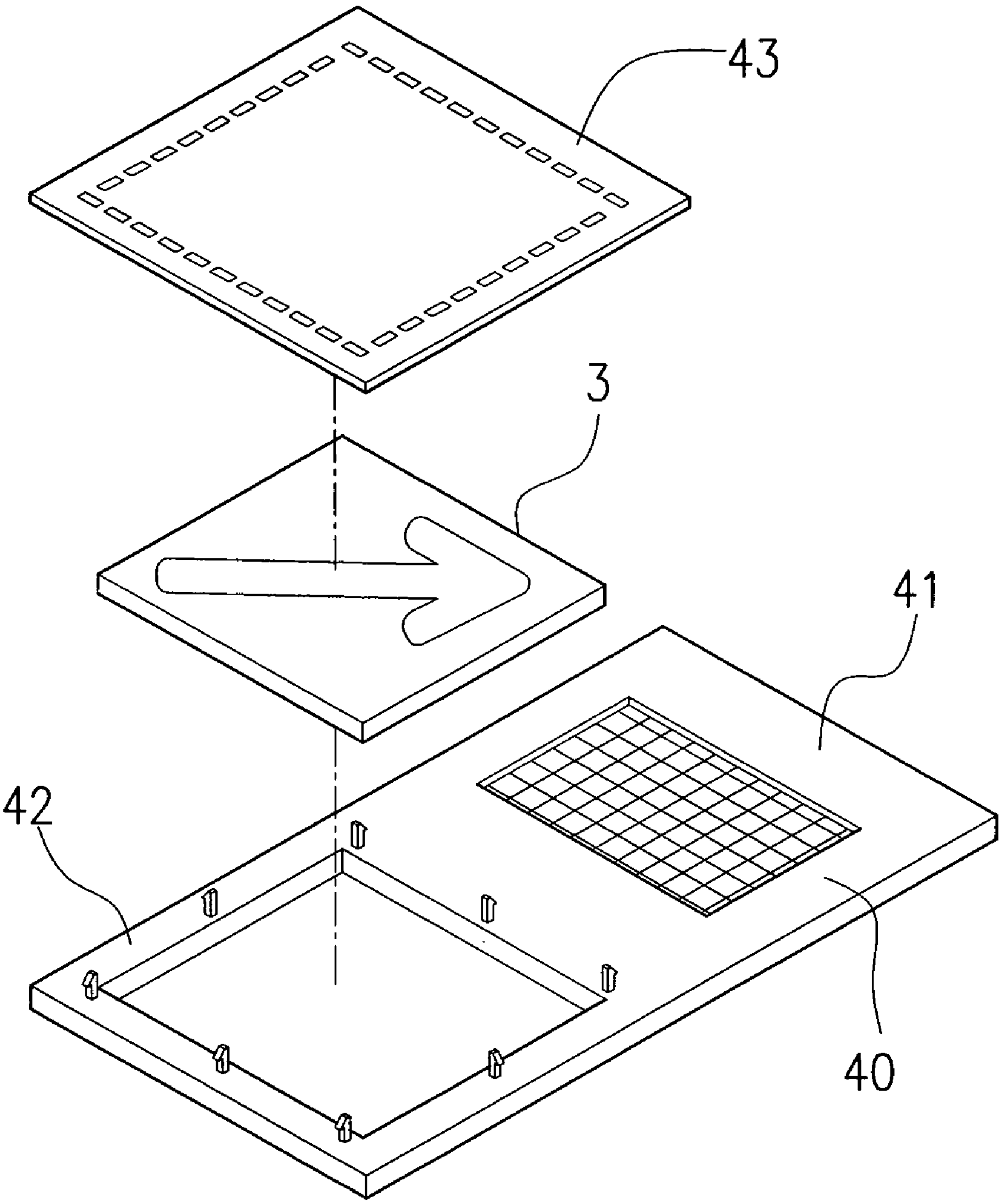
FIG. 6 is an analytic perspective view showing another preferred embodiment of the present invention.

Further please refer to FIG. 6 showing another preferred embodiment of the present invention in which a sensing-chip cover 43 and a frame 40 are separately formed, so that the sensing-chip cover 43 can directly cover the sensing-chip frame section 42. This is favorable in that, the sensing chip 3 and the sensing-chip cover 43 can be assembled in a sensing-chip frame section 42 directly by means of an automatic machine. And a fine-net section 41 similarly has its fine net and fine-net frame made by integrally injection molding.

Figure 7:
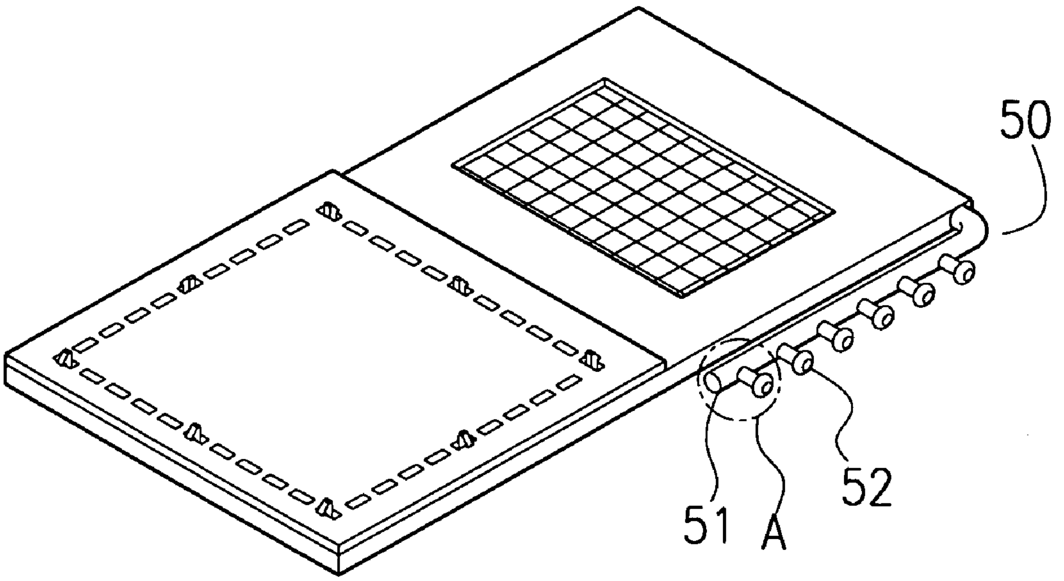
FIG. 7 is a perspective view showing the present invention is further mounted with a stab means.
Figure 7A:
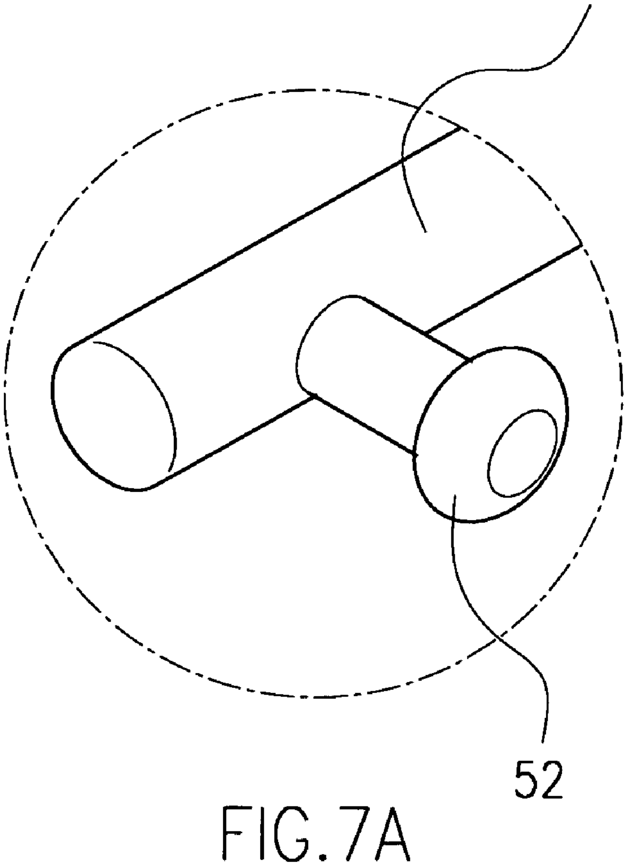
FIG. 7A is an enlarged view of a stab taken from FIG. 7.

Further in designing, the present invention is provided with a stab means 50; referring to FIG. 7, the stab means 50 is integrally formed with the frame, and it can also be separately formed. The stab means 50 protrudes out of a lateral side of the fine-net section, the stab means 50 has a rod 51 having thereon a lot of small stabs 52 extending outwardly. The small stabs 52 are in the shapes of conics or arrows having inverted hooks. Referring to FIG. 7A, the small stabs 52 can directly pierce fabric material on the surfaces of a commodity to fix the hanging tab. The purpose of such designing is to provide the hanging tab with a selection of the mode to directly connect the stab means 50 on the commodity except the mode of mounting by means of the sewn or knitted fine net.

Figure 8:
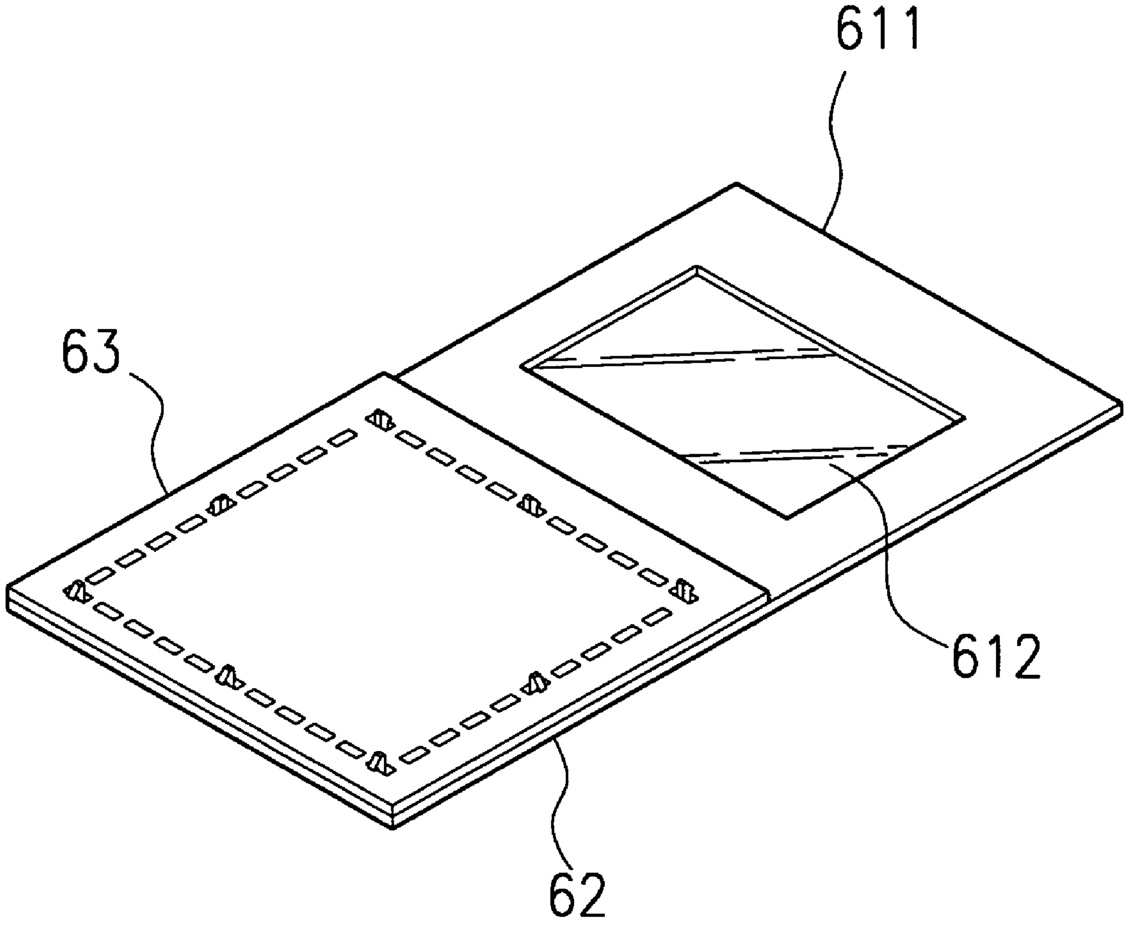
FIG. 8 is a view showing a further preferred embodiment of the present invention in which the fine net is substituted by a thin film.

And in either of the above embodiments of the present invention, by virtue that each fine net is integrally formed with its corresponding frame, the fine net can be substituted by a thin film. Referring to FIG. 8, a thin film 612 is surrounded by a thin-film frame 611 and is integrally formed with the latter. In the same way, the thin-film frame 611 extends and forms a sensing-chip frame section 62 for accommodating a sensing chip and is turned over and covers a sensing-chip cover 63. The thin film 612 has a thickness smaller than that of a thin-film frame 611 thereof for sewing or knitting with threading needles. This is a further preferred embodiment of the present invention.

The invention claimed is:

1. A hanging tab with a sensing chip, said hanging tab has a frame, said frame includes:

a fine-net section having a fine net surrounded by a fine-net frame, wherein said fine-net section and said fine-net frame are integrally formed, a sensing-chip frame section extending at one side of said fine-net frame and having a recess to receive said sensing chip, a plurality of engaging members are provided around said recess, and a sensing chip cover with an area larger than that of an opening of said recess in said sensing-chip frame section to seal said sensing chip; said sensing-chip cover is provided with a plurality of engaging holes each of a size to allow extending through and engaging of a corresponding one of said engaging members.

2. The hanging tab as claimed in claim 1, wherein each of said engaging members is in the form of a semi-arrow to function as an inverted hook to engage a corresponding one of said engaging holes.

3. The hanging tab as claimed in claim 2, wherein said sensing-chip is integrally formed with said frame, and said sensing-chip is turning over to cover said sensing-chip frame section.

4. The hanging tab as claimed in claim 2, wherein said sensing-chip is integrally formed separately from forming of said frame, and said sensing-chip is covering said sensing-chip frame section.

5. The hanging tab as claimed in claim 1, wherein said fine-net section is provided with a stab means protruding out of a lateral side of said fine-net section; said stab means has a rod having thereon a lot of small stabs extending outwardly; said small stabs are structures having inverted hooks, and the small tabs directly piercing a fabric material of a commodity fixing said hanging tab thereto.

6. The hanging tab as claimed in claim 5, wherein said sensing-chip is integrally formed with said frame, and said sensing-chip is turning over to cover said sensing-chip frame section.

7. The hanging tab as claimed in claim 5, wherein said sensing-chip is integrally formed separately from forming of said frame, and said sensing-chip is covering said sensing-chip frame section.

8. The hanging tab as claimed in claim 1, wherein said fine net is substituted by a thin film; said thin film has a thickness smaller than that of a thin-film frame thereof for sewing or knitting.

9. The hanging tab as claimed in claim 8, wherein said sensing-chip is integrally formed with said frame, and said sensing-chip is turning over to cover said sensing-chip frame section.

10. The hanging tab as claimed in claim 8, wherein said sensing-chip is integrally formed separately from forming of said frame, and said sensing-chip is covering said sensing-chip frame section.

11. The hanging tab as claimed in claim 1, wherein said sensing-chip is integrally formed with said frame, and said sensing-chip is turning over to cover said sensing-chip frame section.

12. The hanging tab as claimed in claim 1, wherein said sensing-chip is integrally formed separately from forming of said frame, and said sensing-chip is covering said sensing-chip frame section.

* * * * *